United States Patent [19]

Plumley

[11] Patent Number: 5,098,047
[45] Date of Patent: Mar. 24, 1992

[54] TUBE CLAMP

[75] Inventor: David A. Plumley, Livonia, Mich.

[73] Assignee: Flex Rail, Inc., Livonia, Mich.

[21] Appl. No.: 599,435

[22] Filed: Oct. 18, 1990

[51] Int. Cl.$^5$ .............................................. F16L 3/22
[52] U.S. Cl. ................................................ 248/68.1
[58] Field of Search ................ 248/68.1, 74.4, 231.6, 248/56, 316.1; 16/2

[56] References Cited

U.S. PATENT DOCUMENTS

| | | |
|---|---|---|
| 566,544 | 8/1896 | Smith .................. 248/68.1 |
| 2,473,264 | 6/1949 | Stevens et al. .......... 248/68.1 X |
| 3,397,431 | 8/1968 | Walker . |
| 3,414,220 | 12/1968 | Walker . |
| 3,582,029 | 6/1971 | Moesta .................. 248/300 X |
| 3,682,422 | 8/1972 | Evans ................... 248/68.1 |
| 3,742,119 | 6/1973 | Newman ................ 248/68.1 X |
| 4,878,696 | 11/1989 | Walker . |

Primary Examiner—Alvin C. Chin-Shue
Attorney, Agent, or Firm—Reising, Ethington, Barnard, Perry & Milton

[57] ABSTRACT

A tube clamp assembly (10) for clamping and supporting a rigid coupling (30) or a flexible elastomeric grommet (32). The tube clamp (10) includes a pair of oppositely facing clamping members (12u, 12l) each having a generally U-shaped cross section with at least one clamping seat (26) and an associated clamping hole (28) for mounting one of the coupling (30) and the grommet (32) between the clamping members (12u, 12l). The tube clamp (10) further includes a set of four arcuate flanges (52f, 52b; 54f, 54b) extending into the clamping hole (28) from the clamping seat (26). The flanges (52f, 52b; 54f, 54b) grip an elastomeric grommet (32) upon application of a predetermined clamping force to prevent removal of the grommet (32) from the tube clamp (10) and yield away from a rigid coupling (30) upon application of the predetermined clamping force to allow the rigid coupling (30) to be fully seated against the clamping seat (26).

15 Claims, 3 Drawing Sheets

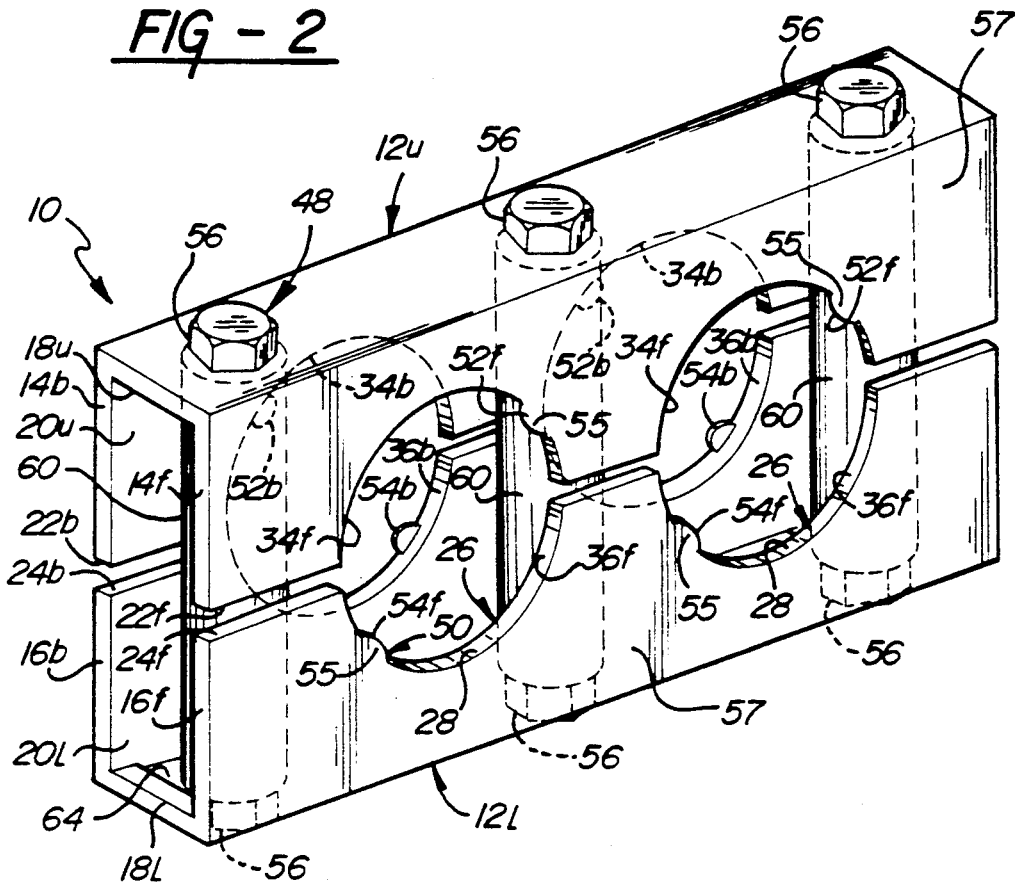
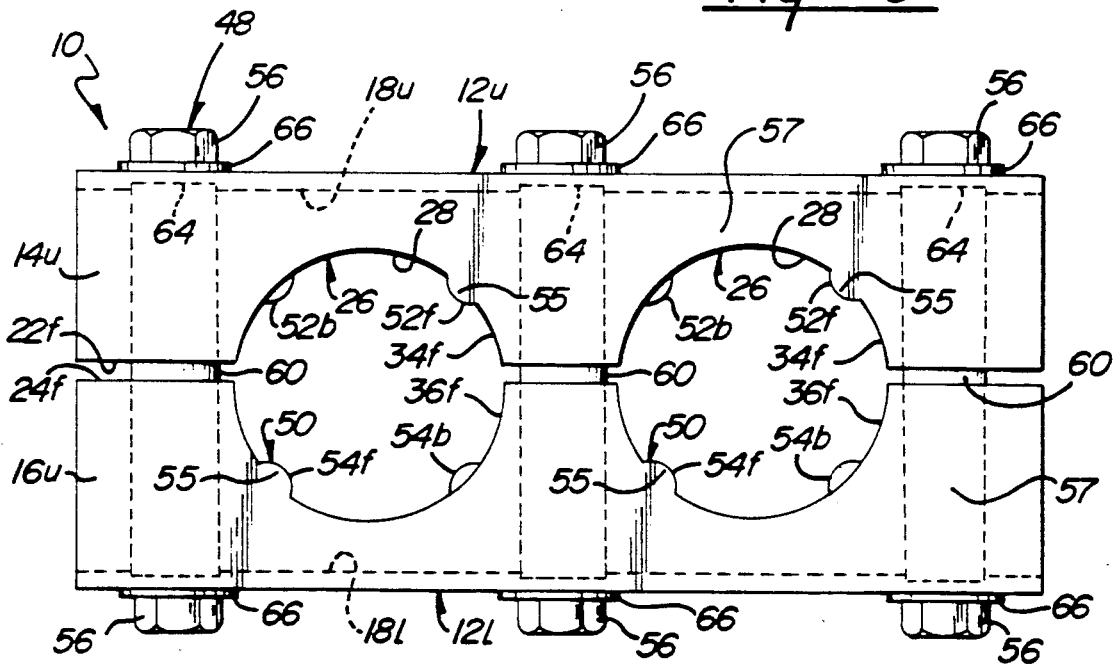

TUBE CLAMP

BACKGROUND OF THE INVENTION

1. Field of the Invention

The present invention relates generally to the tube clamp art, and more specifically to a tube clamp assembly of the type for clamping rigid couplings used for interconnecting pressurized hydraulic fluid lines and flexible elastomeric grommets disposed about a fluid line for absorbing shock and vibration in order to rigidly support the fluid line in a fixed routing.

2. Description of the Related Prior Art

It is well known in the hydraulic fluid power industry to employ various tube clamping devices for rigidly supporting one or more hydraulic fluid lines in a fixed routing. For example, the U.S. Pat. No. 3,397,431 to Walker, issued Aug. 20, 1968, discloses a tube clamp for rigidly clamping a plurality of tubes in fixed positions. With this clamp, a pair of oppositely disposed U-shaped clamping members are stamped from metal and include a plurality of cylindrical flanges or collars extending perpendicularly outwardly from the clamping members. The collars form seats for clamping cylindrical elastomeric grommet members disposed about a tube to assist in reducing vibration or shock when clamped.

This same tube clamp is also shown in U.S. Pat. Nos. 3,414,220 to Walker, issued Dec. 3, 1968 and 4,878,696 to Walker, issued Nov. 7, 1989. As disclosed in these two patents, the cylindrical collars of the clamping members serve as seats for clamping both rigid couplings used for interconnecting hydraulic fluid lines and elastomeric grommets.

When clamping a pressurized fluid line, it is important that the line be properly supported within the clamp to prevent the line from vibrating and eventually leaking. Fluid leakage, of course, is undesirable. Thus, it is important that grommets and couplings be secured tightly within the clamp to properly support the pressurized fluid line.

The prior art tube clamp is deficient because it can only be used with grommets having outside diameters which are held to extremely tight tolerances. If the outside diameter of the grommet used with the tube clamp is slightly undersized, the tube clamp is inherently incapable of gripping the grommet tightly enough to prevent the grommet from eventually working its way out of the tube clamp, thereby permitting vibration and possible leakage of the fluid line.

The account for this deficiency, the grommets currently produced for use with this tube clamp are manufactured by an expensive forming process in order to produce grommets having the necessary critical outside diameter tolerances.

SUMMARY OF THE INVENTION AND ADVANTAGES

The present invention provides a tube clamp of the type for clamping and supporting a rigid coupling for fluid lines or a flexible elastomeric grommet disposed about a fluid line for absorbing shock and vibration. The tube clamp includes a pair of oppositely facing clamping members each having a generally U-shaped cross section defined by a pair of spaced apart side walls and a connecting wall extending therebetween. The side walls define at least one seating surface and a clamping hole for mounting one of the coupling and grommet between the clamping rail. The present invention is characterized by including gripping means extending into the clamping hole from the seating surface for gripping an elastomeric grommet upon application of a predetermined clamping force to prevent sliding movement of the grommet relative to the clamping members and for yielding away from a rigid coupling upon application of the predetermined clamping force to allow the coupling to be seated against the seating surface.

One advantage of the subject invention includes providing a high quality, low cost tube clamp for clamping both elastomeric grommets and rigid couplings and which tube clamp is more tolerant of variances in the outside diameter of the grommet in order to ensure that pressurized fluid lines are properly supported within the tube clamp to prevent possible fluid leakage.

Another advantage of the subject invention is that grommets manufactured by less expensive forming processes, such as standard extrusion, may be used successfully with the subject tube clamp, thereby providing an inexpensive, high quality alternative to the prior art.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2 is a perspective view of the subject invention in the clamped condition;

FIG. 3 is a front view of the subject invention in the clamped condition;

DESCRIPTION OF THE PREFERRED EMBODIMENT

Figure 1:
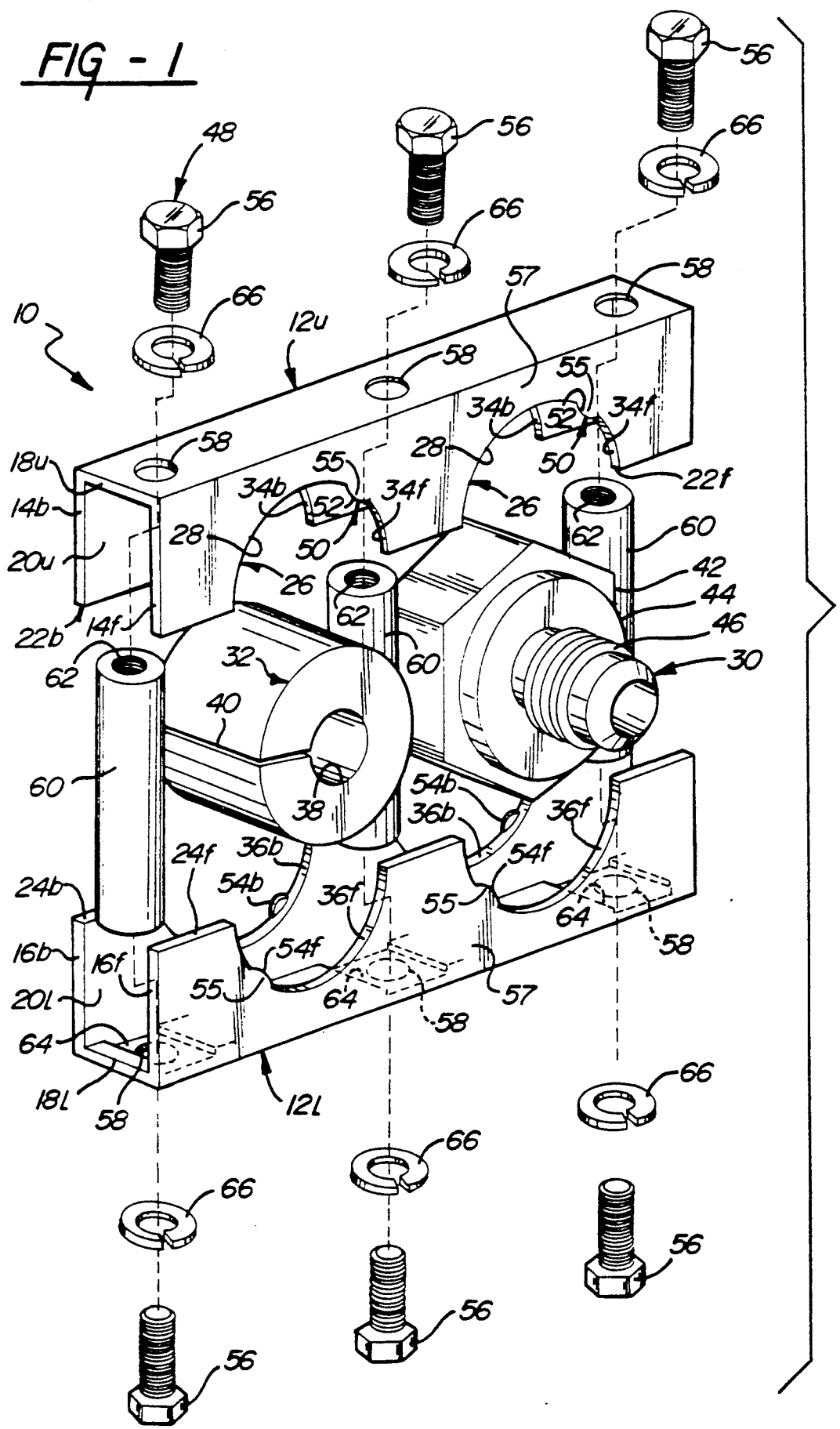
FIG. 1 is an exploded perspective view of the subject invention.

A preferred embodiment of a tube clamp constructed in accordance with the subject invention is generally shown at 10 in the Figures. The tube clamp 10 is particularly well adapted for use in the hydraulic fluid power industry to rigidly clamp and support a plurality of hydraulic fluid lines or tubing in fixed routed positions. However, the subject tube clamp 10 is equally suitable for clamping other types of tubing such as electrical conduits and the like.

The tube clamp 10 includes a pair of oppositely facing clamping members 12u, 12l each having a generally U-shaped cross section defined by a pair of spaced apart side walls 14f, 14b; 16f, 16b and a connecting wall 18u, 18l extending therebetween. That is, the tube clamp 10 includes two clamping members shown in the Figures as an upper clamping member 12u and a lower clamping member 12l. The upper clamping member 12u includes a front side wall 14f and an adjacent back side wall 14b which is connected to the front side wall 14f by the upper connecting wall 18u. The upper front 14f and back 14b side walls extend perpendicularly outwardly from the upper connecting wall 18u in parallel fashion to distal free ends 22f, 22b thereof. The upper front 14f and back 14b side walls and conecting wall 18u have a predetermined thickness and define a U-shaped channel 20u extending along the length of the upper clamping member 12u. The free ends 22f, 22b define an open end of the upper clamping member 12u. Similarly, the lower clamping member 12l includes a front side wall 16f and an adjacent back side wall 16b which is connected to the front side wall 16f by a lower connecting wall 18l. The lower front 16f and back 16b side walls extend perpendicularly outwardly from the lower connecting wall 18l in parallel fashion to respective distal free ends 24f, 24b thereof. The lower front 16f and back 16b side walls and connecting wall 18l define a U-shaped channel 20l extending the length of the lower clamping member 12l. The distal free ends 24f, 24b define an open end of the lower clamping member 12l.

The upper clamping member 12u is identical to the lower clamping member 12l with the clamping members 12u, 12l being inverted upon one another such that the side walls 14f, 14b of the upper clamping member 12u are adjacent the side walls 16f, 16b of the lower clamping member 12l. In other words, the upper 12u and lower 12l clamping members are disposed with their respective open ends thereof adjacent each other so as to form a substantially rectangular elongated tubular member.

The side walls 14f, 14b; 16f, 16b define at least one clamping seat 26 and an associated clamping hole 28 for mounting either a rigid coupling 30 of the type for interconnecting fluid lines or a flexible elastomeric grommet 32 of the type disposed about a fluid line for absorbing shock and vibration when mounted between the clamping members 12u, 12l. As seen in the Figures, the side walls 14f, 14b; 16f, 16b of the clamping members 12u, 12l preferably define a plurality of clamping seats 26 for clamping multiple fluid lines. A tube clamp 10 having two clamping seats is shown in the Figures. However, it will be appreciated that the tube clamp 10 could be provided with additional clamping seats 26 without detracting from the spirit of the invention. Preferably, the clamping seats 26 are equally spaced along the length of the clamping members 12u, 12l to provide a uniform, orderly appearance to the clamped fluid lines.

As further seen by viewing the Figures, each clamping seat 26 includes four semicylindrical surfaces 34f, 34b; 36f, 36b formed in the side walls 14f, 14b; 16f, 16b of the clamping members 12u, 12l at the distal free ends 22f, 22b; 24f, 24b thereof. More specifically, the upper front side wall 14f includes one of the four seating surfaces designated as 34f while the upper back side wall 14b includes another one of the four seating surfaces designated as 34b in the Figures. Similarly, the lower front side wall 16f includes the seating surface 36f while the lower back side wall includes the seating surface designated as 36b. The seating surfaces 34f, 34b; 36f, 36b are disposed perpendicularly to the extended direction of the side walls 14f, 14b; 16f, 16b and define the clamping hole 28. The seating surfaces 34f, 34b of the upper clamping member 12u are aligned normal to the extended length of the clamping member 12u and are disposed in facing alignment with the seating surfaces 36f, 36b of the lower clamping meber 12u such that the clamping hole 28 extends completely through the clamping member 12u, 12l perpendicular to the side walls 14f, 14b. In this manner, the coupling 30 and grommet 32 are supported within the clamping members 12u, 12l by the seating surfaces 34f, 34b; 36f, 36b crosswise in the tube clamp 10 so that the ends of the coupling 30 and grommet 32 extended from the tube clamp 10 outwardly from the side walls 14f, 14b; 16f, 16b.

In the preferred embodiment, the upper 12u and lower 12l clamping members are molded from a fairly rigid, oil-resistant organic polymeric material. A thermoplastic polycarbonate sold under the trademark "LEXAN" has shown to work well.

The grommet 32 is generally cylindrical in shape and includes a longitudinal cylindrical hole 38 extending completely therethrough along the length of the grommet 32. The grommet 32 may be made from any suitable oil-resistant resilient material commonly used in the art to make grommets. In other words, materials which are oil resistant, stretch under tension, have a relatively high tensile strength, retract rapidly, and recover their original dimensions fully are suitable for use with the present invention. The grommet 32 also is provided with a longitudinal split or cut 40 extending along the length of the grommet 32 and into the cylindrical hole 38 allowing the grommet 32 to be spread apart or opened for positioning the grommet 32 about a cylindrical tube or fluid line (not shown). The split 40 also permits the grommet 32 to be squeezed together by the clamping seat 26 for firmly gripping the tube (not shown) to secure the tube tightly within the tube clamp 10.

The disclosed rigid coupling 30 is commonly referred to as a union, bulkhead or junction adapter in the hydraulic fluid power industry and is commercially available. The union 30 is machined from commercially available hexagonal barstock metal and is formed with a hexagonal central body portion 42 having a width dimensioned to be received within the U-shaped channels 20u, 20l of the clamping members 12u, 12l. That is, the width of the body 42 approximates the spacing between the side walls 14f, 14b; 16f, 16b. Cylindrical shoulders 44 are formed on each axial side of the central body portion 42 and are dimensioned to be seated within a clamping seat 26 of the tube clamp 10. That is, the diameter of the shoulders 44 are approximately equal to the diameter of the clamping seat 26. The union 30 also includes threaded connection portions 46 extending outwardly from each of the cylindrical shoulders 44 for connection to a hydraulic fluid line (not shown). The union 30 thus serves as a junction between two fluid lines (not shown).

Figure 5:
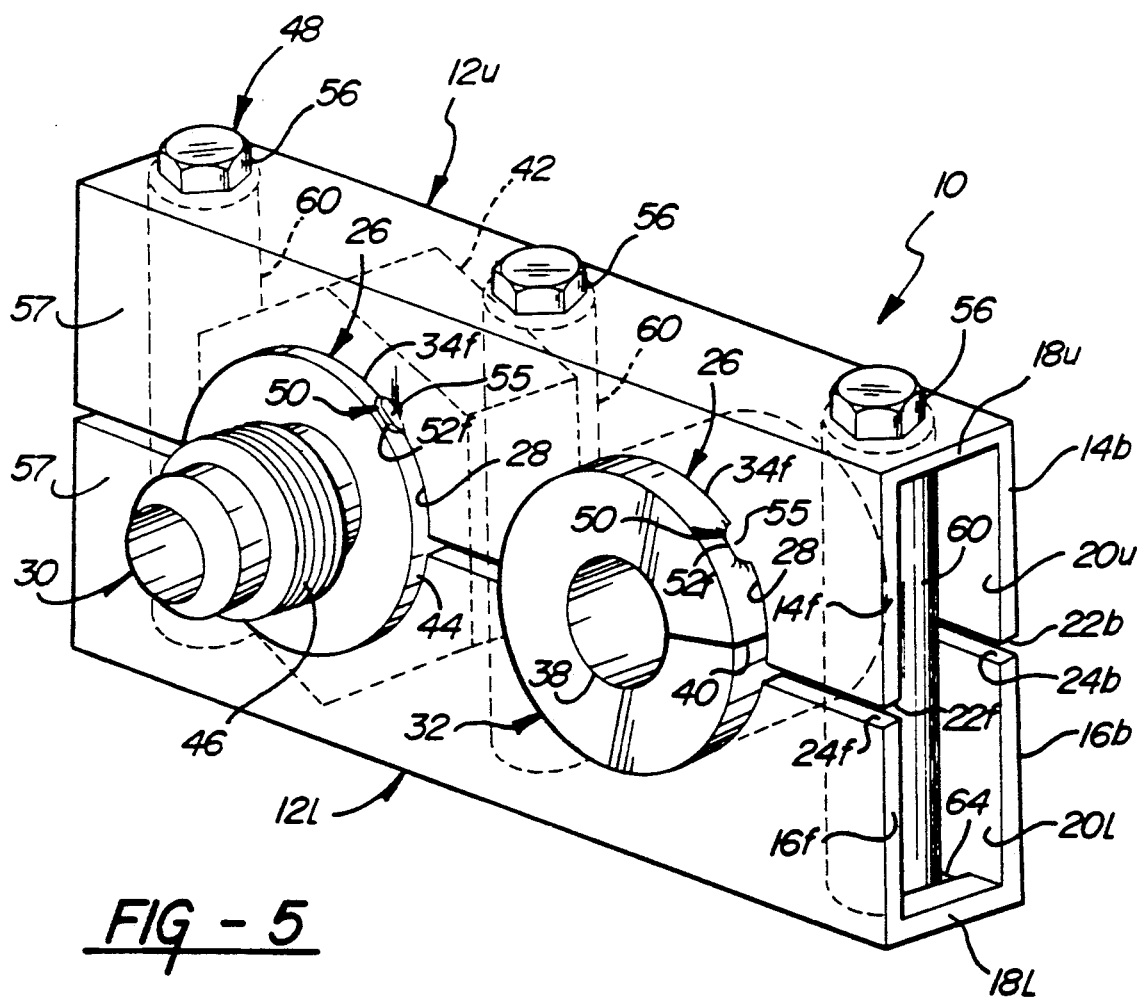
FIG. 5 is a perspective view of the subject invention in the clamped condition and shown clamping an elastomeric grommet and a rigid coupling.

The tube clamp assembly 10 further includes fastening means 48 for fastening the clamping members 12u, 12l together. The fastening means 48 engages the clamping members 12u, 12l and applies a predetermined clamping force to the clamping members 12u, 12l to thereby urge the clamping seats 26 into firm clamping engagement with the outer cylindrical surface of an elastomeric grommet 32 or the cylindrical shoulders 44 of a rigid coupling 30 (i.e., a clamped condition). As seen in FIG. 5, the clamping seats 26 are fully engaged with the outer cylindrical surface of the grommet 32 and the cylindrical shoulders 44 of the coupling 30 when the clamped condition. That is, there is full contact between the seating surface 34f, 34b; 36f, 36b of each clamping seat 26 and the respective grommet 32 or coupling 30 clamped thereby.

The tube clamp assembly 10 is further provided with gripping means 50 extending into the clamping hole 28 from the clamping seat 26 for gripping an elastomeric grommet 32 upon application of the predetermined clamping force applied to the clamping members 12u, 12l in order to prevent sliding movement of the grommet 32 relative to the clamping members 12u, 12l and for yielding away from a rigid coupling 30 upon application of the predetermined clamping force to allow the rigid coupling 30 to be seated against the clamping seat 26. More specifically, the gripping means 50 comprises at least one arcuate flange and preferably a set of four such arcuate flanges 52f, 52b; 54f, 54b with one extending perpendicularly from each of the seating surfaces 34f, 34b; 36f, 36b radially into the clamping hole 28 and parallel to the side walls 14f, 14b; 16f, 16b and molded integrally with the clamping members 12u, 12l out of the same material. Thus, the upper front seat surface 34f includes an arcuate flange enumerated as 52f in the Figures while the upper back seating surface 34b includes an arcuate flange enumerated as 52b in the Figures. Similarly, the lower front seating surface 36f includes an arcuate flange enumerated as 54f in the Figures while the lower back seating surface 36b includes an arcuate flange enumerated as 54b in the Figures. Preferably, each of the clamping seats 26 includes gripping means 50 of the type described hereinabove.

As shown best in FIG. 3, the set of four arcuate flanges 52f, 52b; 54f, 54b are disposed 90° apart along the clamping seat 26. That is, when looking directly into the clamping hole 28, as in FIG. 3, one arcuate flange is spaced 90° from the next adjacent arcuate flange. Also, the arcuate flanges 52f, 52b; 54f, 54b alternate between front 34f, 36f and back 34b, 36b seating surfaces. That is, the arcuate flanges 52f, 54f extending from the front seating surfaces 34f, 36f are disposed 180 apart from one another and 90° from each of the arcuate flanges 52b, 54b extending from the back seating surfaces 34b, 36b. This alternating arrangement of the flanges 52f, 52b; 54f, 54b provides for uniform clamping of an elastomeric grommet 32 to prevent its removal from the tube clamp 10.

When the predetermined clamping force is applied to the clamping members 12u, 12l by the fastening means 48, it can be seen in FIG. 5 that in addition to the clamping seat 26 fully clamping the flexible elastomeric grommet 32, the arcuate flanges 52f, 52b; 54f, 54b (only one shown) bite into the grommet 32 to positively retain the grommet 32 within the tube clamp 10 and prevent it from inadvertently being pulled or slid out of the clamp 10. Because of the relative hardnesses between the soft, elastomeric grommet 32 and the relatively hard, rigid arcuate flanges 52f, 52b; 54f, 54b, the grommet force applied to the clamping members 12u, 12l, enabling the arcuate flanges 52f, 52b; 54f, 54b to extend into the grommet 32 by deforming the outer surface of the grommet 32. The arcuate shape of the flanges 52f, 52b; 54f, 54b ensures that the grommet 32 is not punctured or penetrated by the flanges 52f, 52b; 54f, 54b, but rather deformed sufficiently to positively retain the grommet 32 in the tube clamp 10.

Because the flanges 52f, 52b; 54f, 54b extend from the clamping seat 26 inwardly into the clamping hole 28, the tube clam 10 adapts to normal variances in the dimension of the outside diameter of commercially produced grommets 32, unlike the prior art tube clamps. Ideally, the outside diameter of the grommet 32 should be slightly larger than the diameter of the clamping seat 26 (and thus the clamping hole 28) so that the grommet 32 is firmly gripped by the clamping seat 26 when in the clamped condition so as to resist removal of the grommet 32 from the tube clamp 10. However, if the outer surface of the grommet 32 is slightly undersized in diameter, the clamping ability of the clamping seat 26 is greatly diminished since it will be unable to firmly grip or deform the grommet 32 thereby enabling the grommet 32 to be slid out of or moved from the tube clamp 10. The subject flanges 52f, 52f; 54f, 54b, accommodate even an undersized grommet 32 by extending into the clamping hole 28 beyond the clamping seat 26 to engage and grip the grommet 32 even when the clamping seat 26 can not. Thus, the subject tube clamp 10 works equally well with commercially available costly grommets 32 produced by an expensive forming process which closely controls the dimensional variances in the outer surface of the grommet as with less expensive-type grommets 32 which may have slight dimensional variances in the outer surface diameter.

Referring again to FIG. 5, it can be seen that when the tube clamp 10 is employed for clamping a rigid coupling 30, the arcuate flanges 52f, 52b; 54f, 54b (only one shown) collapse or crush in response to the predetermined clamping force which urges the flanges 52f, 52b; 54f, 54b into engagement with the cylindrical should portions 44 of a rigid coupling 30. The flanges 52f, 52b; 54f, 54b permanently deform under the applied load because of the relative strength of the material used for the clamping members 12u, 12l (and thus the arcuate flanges 52f, 52b; 54f, 54b ) and the rigid coupling 30. The clamping members 12u, 12l are fabricated from a relatively soft organic polymeric material such as a thermoplastic polycarbonate whereas the coupling 30 is fabricated from a relatively hard, stronger metallic material. Thus, the force of the rigid metal coupling 30 against the relatively small, soft organic polymeric flanges 52f, 52b; 54f, 54b causes them to fail upon application of the clamping force.

The couplng 30 must be firmly clamped and supported within the tube clamp 10 to prevent fluid leakage. Thus, it is preferred that the cylindrical shoulders 44 be firmly seated or nested against the clamping seat 26 such that the seating surfaces 24f, 34b; 36f, 36b are fully contacted by the cylindrical shoulders 44. The arcuate flanges 52f, 52b; 54f, 54b thus enable the tube clamp 10 to properly and positively clamp both elastomeric, yieldable grommets 32 by gripping the grommets 32 upon application of the predetermined clamping force, and rigid couplings 30 by yielding away from the coupling 30 upon application of the predetermined clamping force to permit the coupling 30 to be properly seated against the clamping seat 26.

The arcuate flanges 52f, 52b; 54f, 54b are relatively thin-walled plates or disc-shaped projections having the appearance of a segment of a circle when viewed looking directly into the clamping hole 28, as in FIG. 3. The flanges 52f, 52b; 54f, 54b have a thickness which is relatively less than the thickness of the side walls 14f, 14b; 16f, 16b and preferably about 1/6 of the thickness of the side walls 14f, 14b; 16f, 16b. Each of the flanges 52f, 52b; 54f, 54b have an outer surface 55 which is flush with an outer surface 57 of the respective side walls 14f, 14b; 16f, 16b such that the outer surface 55 of a flange is merely an extension of the outer surface 57 of an associated side wall extending beyond its associated clamping seat.

The fastening means 48 comprises standard machine screw fasteners or threaded bolt members 56 extending through fastener holes 58 formed in the connecting walls 18u, 18l of the clamping members 12u, 12l. The bolt members 56 threadably engage associated nut members 60 for fastening the clamping members 12u, 12l together. The threading together or tightening of the bolt members 56 and associated not members 60 serves to apply the aforementioned clamping force to the clamping members 12u, 12l.

The fastener holes 58 are spaced equally apart along the longitudinal length of the connecting walls 18u, 18l. The fastener holes 58 of the upper clamping member 12u have oppositely aligned pairs of fastener holes 58 formed in the lower clamping member 12l and are disposed intermediate the longitudinally spaced clamping holes 28. Thus, a clamping hole 28 (and thus a clamping seat 26) will have a pair of oppositely aligned fastener holes 58 adjacent each side of the clamping hole 28.

The nut members 60 are preferably elongated cylindrical spacers having an internally threaded bore or hole 62 extending completely therethrough. The spacers 60 are positioned within the upper 20u and lower 20l U-shaped channels and extend between the connecting walls 18u, 18l of the clamping members 12u, 12l. The spacers 60 have a predetermined length which serves to prevent the clamping members 12u, 12l from being overtightened against the rigid couplings 30 and elastomeric grommets 32. Over tightening can potentially harm the clamping members 12u, 12l and/or the grommets 34.

Figure 4:
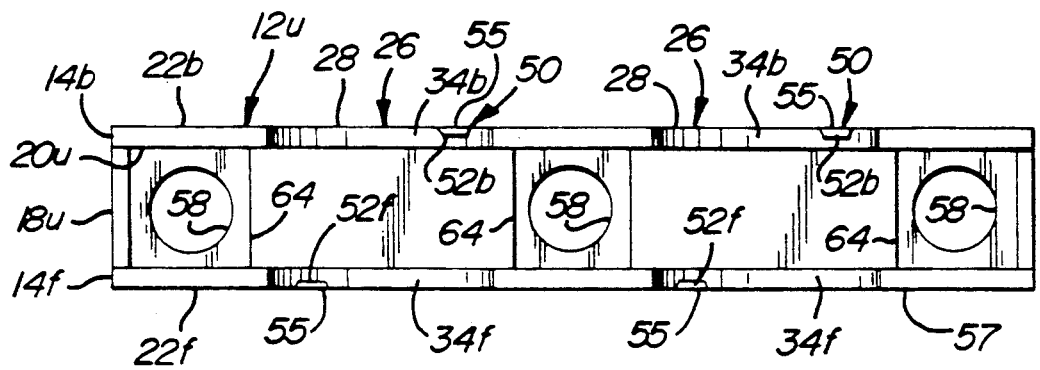
FIG. 4 is a view of the upper clamping member looking down into the U-shaped channel.

The clamping members 12u, 12l further include spacer alignment means 64 formed on the connecting walls 18u, 18l for positively aligning the threaded bore 62 of each of the spacers 60 with an associated pair of oppositely aligned fastener holes 58 formed in the connecting walls 18u, 18l. More specifically, the spacer alignment means 64 comprises depressed regions or indentations or depressions 64 formed about each of the oppositely aligned fastener holes 58 and dimensioned for receiving the ends of the spacers 60. The depressions 64 are preferably square shaped as shown in FIG. 4 with a width dimension slightly larger than the outer diameter of the cylindrical spacers 60 for accommodating the spacers 60 within the depressions 64.

The threaded bolt members 56 are matingly and threadably received in each end of the internally threaded bores 62 for fastening the clamping members 12u, 12l together in the clamped condition. The tightening of the bolt members 56 applies the clamping force to the clamping members 12u, 12l. Lock washers 66 may also be used with the bolts 56 to ensure that the bolt members 56 can not be inadvertently removed from the spacer 60 once tightened.

The spacess 60 also prevent the coupling 30 from rotating in the tube clamp 10 by engaging the flats of the hexagonal-shaped central body portion 42 of the coupling 30. The body portion 42 of the coupling 30 is thus tightly captured within the U-shaped channels 20u, 20l of the clamping members 12u, 12l.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A tube clamp assembly (10) of the type for clamping and supporting rigid couplings (30) for fluid lines and flexible elastomeric grommets (32) disposed about a fluid line for reducing shock and vibration, said tube clamp (10) comprising:

a pair of oppositely facing clamping members (12u, 12l) each having generally U-shaped cross section defined by a pair of spaced apart side walls (14f, 14b; 16f, 16b) and a connecting wall (18u, 18l) extending therebetween, said side walls (14f, 14b; 16f, 16b) defining at least one clamping seat (26) at distal free ends (22f, 22b; 24f, 24b) of said side walls and a clamping hole (28) for mounting one of the couplings (34) and the grommets (32) between said clamping members (12u, 12l);

characterized by including gripping means (50) extending into said clamping hole (28) from only a portion of said clamping seat (26) and leaving a major portion of said clamping seat free of said gripping means for biting into and gripping an elastomeric grommet (32) upon application of a predetermined clamping force to said clamping members (12u, 12l) to prevent sliding movement of the grommet (32) relative to said clamping members (12u, 12l) and for yielding and permanently deforming away from a rigid coupling (30) upon application of the predetermined clamping force to allow the rigid coupling (30) to be seated against said clamping seat (26).

2. An assembly as set forth in claim 1 further characterized by said clamping members (12u, 12l) fabricated from an organic polymeric material.

3. An assembly as set forth in claim 1 further characterized by said gripping means (50) comprising at least one arcuate flange.

4. An assembly as set forth in claim 3 further characterized by said clamping seat (26) comprising four semi-cylindrical seating surfaces (34f, 34b; 36f, 36b) formed in said side walls (14f, 14b; 16f, 16b) of said clamping members (12u, 12l).

5. An assembly as set forth in claim 4 comprising four arcuate flanges (52f, 52b; 54f, 54b), each of which extends from an associated seating surface (34f, 34b; 36f, 36b) radially into said clamping hole (28).

6. An assembly as set forth in claim 5 wherein said side walls (14f, 14b; 16f, 16b) have a predetermined wall thickness defining outer surfaces (57) further characterized by said arcuate flanges (52f, 52b; 54f, 54b) having a thickness relatively less than said thickness of said side walls (14f, 14b; 16f, 16b).

7. An assembly as set forth in claim 6 further characterized by each of said arcuate flanges (52f, 52b; 54f, 54b) having an outer surface (55) flush with said outer surfaces (57) of said side walls (14f, 14b; 16f, 16b).

8. An assembly as set forth in claim 5 further characterized by said arcuate flanges (52f, 52b; 54f, 54b) being disposed 90 degrees apart from one another along said clamping seat (26).

9. An assembly as set forth in claim 8 further characterized by said clamping members (12u, 12l) having a plurality of longitudinally spaced apart clamping seats (26), each of said clamping seats (26) having associated gripping means (50) and adapted to mount one of the couplings (30) and the grommets (32) between said clamping members (12u, 12l).

10. An assembly as set forth in claim 9 further characterized by including fastening means (48) for fastening said clamping members (12u, 12l) together.

11. An assembly as set forth in claim 10 further characterized by said clamping members (12u, 12l) including oppositely aligned pairs of fastener holes (58) formed in said connecting walls (18u, 18l) in longitudinally spaced apart positions.

12. An assembly as set forth in claim 11 further characterized by said fastening means (48) comprising threaded bolt members (56) extending through said fastener holes (58) and nut members (60) threadably engaged with associated said bolt members (56).

13. An assembly as set forth in claim 12 further characterized by said nut members (60) comprising a plurality of spacers (60) extending between said connecting walls (18u, 18l), each of said spacers (60) provided with an internally threaded bore (62) extending completely therethrough and matingly receiving said bolt members (56) associated therewith to secure said clamping members (12u, 12l) together.

14. An assembly as set forth in claim 13 further characterized by said clamping members (12u, 12l) including spacer alignment means (64) formed on said connecting walls (18u, 18l) for positively aligning said threaded bore (62) of each of said spacers (60) with a pair of said oppositely aligned fastener holes (58) formed in said connecting walls (18u, 18l).

15. An assembly as set forth in claim 14 further characterized by said spacer alignment means (64) comprising a depression (64) formed about each of said oppositely aligned fastener holes (58) and dimensioned for receiving the ends of said spacers (60) within said depression (64).

* * * * *